3,019,995
CABLE APPLICATOR AND REWIND UNIT
Raymond H. Eckert, 1350 Washington St., Fairfield, Calif., and Robert P. Baldwin, 2317 N. Richmond St., Arlington, Va.
Filed Apr. 24, 1961, Ser. No. 105,237
8 Claims. (Cl. 242—54)
(Granted under Title 35, U.S. Code (1952), sec. 266)

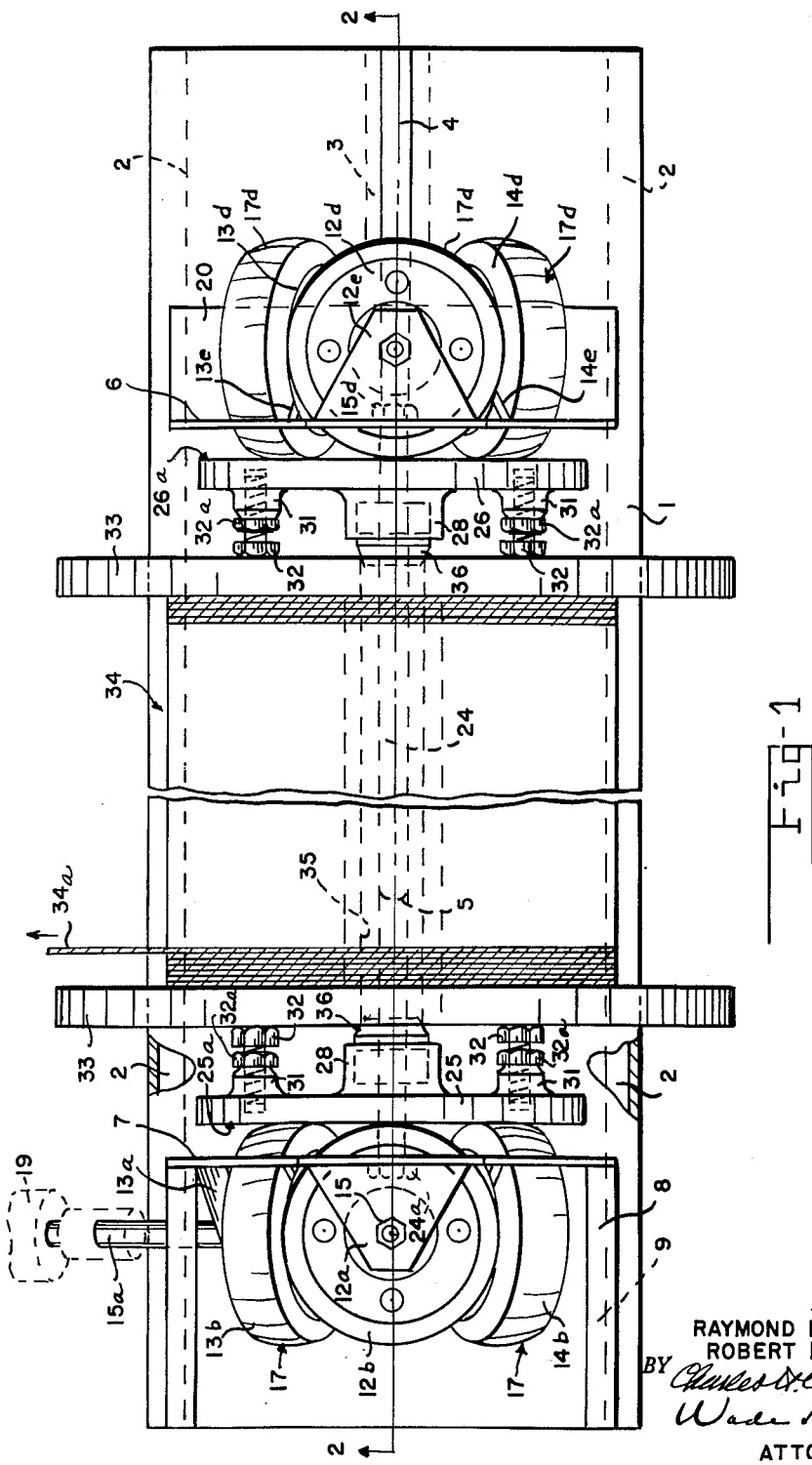

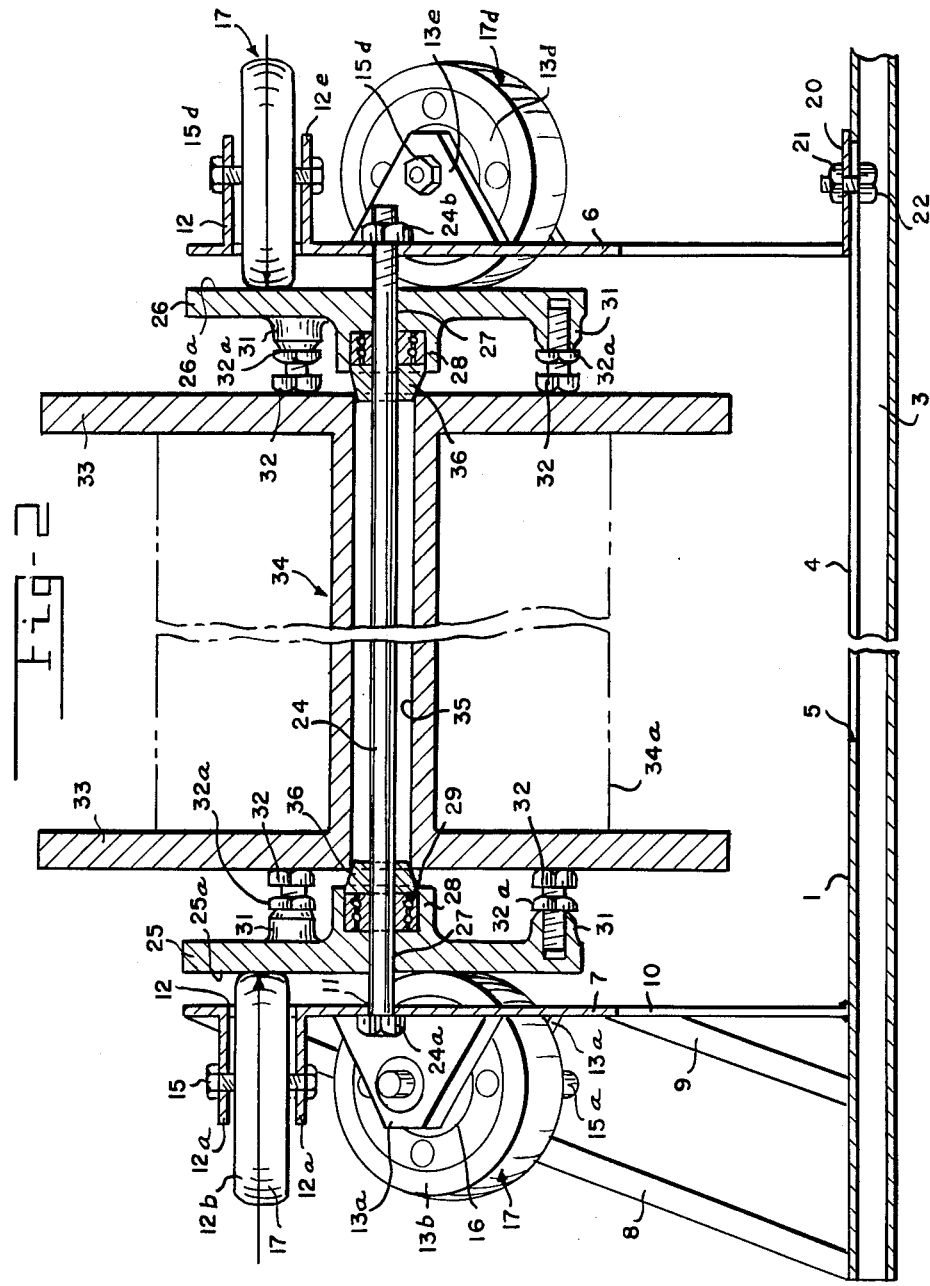

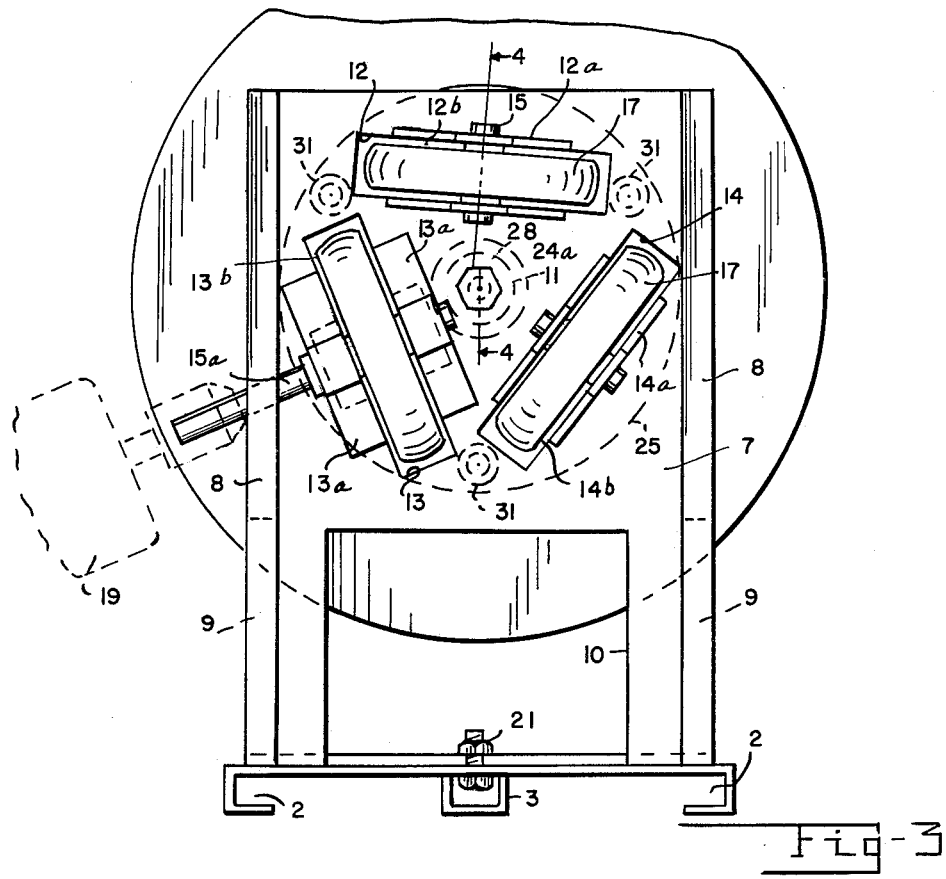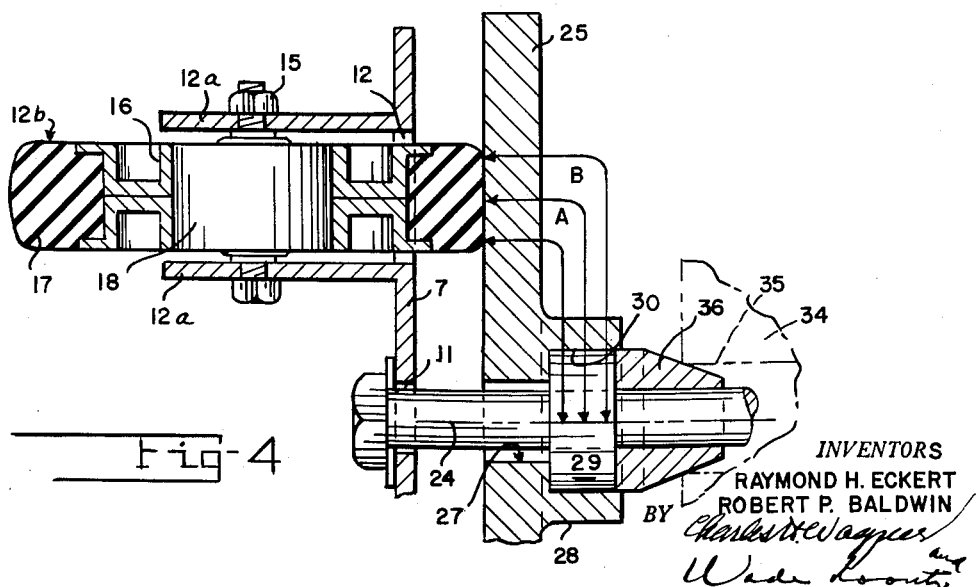

The invention described herein may be manufactured and used by or for the United States Government for governmental purposes without payment to us of any royalty thereon.

This invention is an improvement in cable applicators and cable rewind units, especially for use in connection with applying wire cable to, or removing the same, from aircraft target tow cable reels, and has for an object the provision of means for maintaining a desired uniform tension on the cable being unwound from a cable supply spool onto a tow cable reel of a tow target system, or while being unwound from the aircraft tow target reel back onto the cable supply spool.

A further object is the provision of a cable applicator and cable rewind unit which is effectively and efficiently usable with cable supply spools of different lengths and different diameters.

A still further object is a device of the class described which is usable with spools having wooden end flanges, even if the same are warped and uneven.

A still further object is the provision of a cable tensioning unit for maintaining a predetermined tension on the cable being unwound from a cable supply spool containing a small diameter wire cable, which includes means for centering the spool on the device and maintaining its centered position in a fixed axial relation during withdrawal of the cable from the spool, in which the tensioning means maintains a predetermined uniform adjustable frictional drag on the end flanges of the cable spool without the use of hydraulic gears, brake bands, friction brakes, etc.

A further object is the provision of a simple, lightweight, inexpensive tensioning means for maintaining a uniform resilient tension on a cable spool during the withdrawal of a wire cable wound thereon, in which means are provided for easily and quickly mounting and centering thereon cable spools of different lengths and diameters.

A further object is the employment of rubber-like wide tread rolls having their treads disposed in equal radially spaced planes around the central axis of the cable spool, with the axes of the rolls extending inwardly in slightly offset relation to the axis of the cable spool.

A further object is the provision of power applying means fixed to one of the rolls for rotating the same to rotate the cable spool for applying tension uniformly and evenly to the spool during winding a wire cable thereon.

A further object is the provision of a device having a support and a pair of end plates thereon normal to the support with a tie-rod or shaft extending through the end plates for tensioning the same toward each other and traction disk plates rotatably mounted on the shaft adjacent each of the end plates which are adapted to receive the end flanges of a cable spool therebetween, together with adjustable abutment means carried in circularly spaced relation around the adjacent or facing surface of the friction plates for impinging and positioning engagement with the outer end surfaces of the opposite side flanges of a cable spool, to accommodate unevenness in these side flanges and clamp the cable spool therebetween, in which means are carried by the traction disks for centering the opposite side flanges of the cable spool thereon, and the provision of a plurality of resilient tread friction rolls carried by each of said end plates with the tread thereof disposed in frictional contact with the flat outer surfaces of each of the traction disks in slight offset relation around a wide circular path on the surface of the traction disk concentric to the centers of the disks, together with means on the shaft for tensioning the two end plates toward each other for increasing the frictional contact of said friction rolls on said traction disks for simultaneously increasing the contacting relation of the rolls on the surface of the traction disks to increase the resistance to rotation of said traction disks.

Other objects and advantages of the invention will become apparent from the following description and accompanying drawings in which like reference characters refer to like parts in the several figures.

In the drawings:

FIG. 1 is a plan view of a cable applicator and rewind unit incorporating the invention therein, parts broken away;

FIG. 2 is a longitudinal sectional view taken about on the plane indicated by line 2—2 in FIG. 1;

FIG. 3 is an end view of the structure disclosed in FIGS. 1 and 2, looking inwardly toward the stationary or fixed end plate, a power means for rotating one of the traction rolls being shown in phantom; and FIG. 4 is a detailed sectional view, somewhat enlarged, taken about on the plane indicated by line 4—4 of FIG. 3, looking in the direction of the arrows.

The invention comprises a small, compact, lightweight, mobile unit, preferably fabricated in steel, and employed to apply and to remove cable to and from any tow reel apparatus employed by the military or industry, in which means are provided for maintaining a desired tension to the cable as it is being applied to the tow reel system.

Cable applied to a tow reel system without proper tension results in cable malfunction, cable burying in the tow reel system, and subsequent cable breakage during tow reel operation.

The apparatus comprises a flat base plate or support 1, reinforced and stiffened by rebent flanges 2 along the opposite side edges of its lower surface and may also be provided with a central longitudinal U-shaped rib 3 along its lower surface, or partly along the surface.

The surface of the plate 1 is slotted longitudinally at 4, having a narrower width than the width between the flanges of the U-shaped rib 3, and the slot 4, as seen in FIG. 2, terminates at some point 5 intermediate the opposite ends of the base 1. The slot 4 and rib 3 provide a sort of bayonet slot for longitudinal adjustment of a movable supporting end plate 6, later referred to more specifically.

Secured to and extending upwardly perpendicularly to the base plate 1 is a fixed end plate 7, which is braced from the base plate 1 by spaced inclined brace members 8 and 9, so as to be rigid and stiff, the plate having a cutout opening 10 in its bottom portion, a shaft or axle receiving opening 11, and three elongated rectangular openings 12, 13 and 14 which are disposed at equal radial distance from the center of shaft opening 11 in equal circularly spaced relation to each other, the openings 12 being at the top of the plate 7.

The longitudinal axes of the opening are all at a slight angular relation in the same circular direction to a tangent to a circle on the plate, having its center at the center of the shaft or axle opening 11 for reasons later set forth.

Spaced side plates 12$^a$, 13$^a$ and 14$^a$ extend outwardly from the end plate 7 at each side of the respective openings 12, 13 and 14 and resilient or rubber-like tread friction rolls 12$^b$, 13$^b$ and 14$^b$, similar to that shown in section in FIG. 4, are mounted between the respective plates 12$^a$, 13$^a$ and 14$^a$ on shafts or axles 15, each of the rolls comprise a central core or hub portion 16 and a rubber-like tread 17, the rolls being preferably provided with double row ball bearings 18.

The roll 13$^b$ and side plates 13$^a$ are slightly different from those just described in that the axle is a shaft 15$^a$ which is splined or fixed to the hub, and the side plates are thicker and each contain ball bearings for journalling the shaft 15$^a$ and its roll 13$^b$, this axle or shaft extending out beyond the side of the device, as seen in FIGS. 1 and 3, where a power device, such as an electric or pneumatic drill 19 can be "chucked" thereon for driving the shaft 15$^a$ and its roll 13$^b$ under power, as indicated at 19 in FIGS. 1 and 3.

The adjustable plate 6 is provided with rubber tread rolls in similar fashion and position to the rolls 12$^b$, 13$^b$ and 14$^b$, these rolls being indicated at 12$^d$, 13$^d$ and 14$^d$ and having side resilient rubber friction tread 17$^d$ and are carried between the side plates on the axes 15$^d$ and extend through and beyond openings in the adjustable plate 6, arranged identical to the openings 12, 13 and 14 in the fixed plate 7, except that all side plates are the same thickness and all of the rolls contain the double row ball bearing therein for journalling them for free rotation on the axes 15$^d$, the side plates for the rolls 12$^d$, 13$^d$ and 14$^d$ being indicated at 12$^e$, 13$^e$ and 14$^e$.

The adjustable plate 6 has a lower angle flange 20 which rests in contact on the top surface of the base plate 1 and a securing bolt 21 extends through the slot 4 with its head 22 disposed in the channel 3 engaging the under surface of plate 1 at opposite sides of the slot. The plate 6 can thus be adjusted longitudinally on the base plate 1 to different parallel spaced relations to the plate 10 by loosening the bolt 21.

The plate 6 also has a central shaft or tie-rod opening 23 and a tie-rod or axle shaft 24 having a head 24$^a$ at one end for impinging engagement with the outer surface of the fixed end plate 1 extending through the opening 23 while the other end portion of the tie-rod axle shaft extends through the opening 11 and is threaded, having a nut 24$^b$ threaded thereon for impinging engagement with the outer surface of the adjustable plate 6, the axle extending through both of the axle openings 11 and 23 in the plates 7 and 6, and is disposed parallel to the base plate 1 and perpendicular to both of the parallel end plates 7 and 6.

A pair of friction disks or plates 25 and 26 are journalled on the shaft or axle 24, respectively in adjacent spaced parallel relation to the plates 7 and 6, as shown in FIGS. 1 and 2, the disks 25 and 26 having flat friction surfaces 25$^a$ and 26$^a$ disposed in frictional engagement with the resilient rubber-like treads 17 and 17$^d$ of the friction rolls 12$^b$, 13$^b$, 14$^b$ and 12$^d$, 13$^d$ and 14$^d$, the shaft or axle 24 extending through suitable central opening 27 through the disks. Each of the disks has a central hub portion 28 which contains a double row ball bearing unit 29 journalled on the axle 24 and seated in an annular recess 30, and a plurality of bosses 31 are carried by each disk adjacent its periphery which are internally threaded and receive threaded studs 32 which are axially adjustable to frictionally engage and clamp the side flanges 33 of a wire cable supply or storage spool or reel 34 therebetween, the spool 34 having a wire cable 34$^a$ being wound thereon or withdrawn therefrom. Suitable locking means on the studs 32, such as jam nuts 32$^a$, may be provided to secure the adjustment, thus providing means concentrically spaced around the center of the disk for impinging engagement with the outer opposite sides of a supply cable reel 34 when mounted on the axle 24, in a plurality of radially and circumferentially spaced contact points, especially in the case of wooden spools and where the end flanges 33 thereof may be warped or uneven, thus providing means for the reel to run true, concentric to the axis of the tie-rod axle 24 regardless of the conditions of the end flanges. These supply cable reels 34 are provided with an adequate central passage or bore 35 therethrough from end to end for supporting the same on a pipe or rod during the winding or unwinding of the cable therefrom.

Suitable conical centralizing bushings 36 are disposed on the tie-rod 24, as seen in FIGS. 2 and 4, with the conical ends facing each other, inserted in centralizing engagement with the bore 35 through the cable spool, the bushings 36 having a diameter to fit into the entrances of the bearing recesses 30 with the flat ends thereof in contact with the bearing 29 holding them seated in the recesses during reeling and unreeling operations. When a cable spool, such as 34, is disposed on the axle or tie-rod shaft 24, between the end plates 6 and 7 and the nut 24$^b$ tightens to draw the plates 6 and 7 together the rubber-like treads of the rolls 12$^b$, 13$^b$ and 14$^b$ and 12$^d$, 13$^d$ and 14$^d$ are compressed at points of their contact with the flat surfaces 25$^a$ of the friction disks 25 and 26. Since the resilient treads 17, 17$^d$ are fairly wide, namely 1½ inches wide and about 6 inches in diameter and the medium radius of the "tread circle" of the center plane of the rolls on the friction disks 25 and 26 is comparatively small, namely a radius of about 3 inches, it will be observed that half, or approximately ¾ of an inch of the tread indicated at A in the FIG. 3, in contact on the inside portion of the roll is moving slower than the middle of the tread and ¾ of an inch of the tread indicated at B on the outside portion of the roll is moving faster than the middle portion. This causes the contacting portion of the tread of each roll or wheel to have a co-equal and opposite skidding action against the dry surface of the friction disks 25 and 26, thus producing a predetermined and uniform yielding resistance to rotation of the friction disks during withdrawal of the wire cable 34$^a$ therefrom. This can be increased or decreased by adjustment of the tensioning action of the tie-bolt 24 on the two plates 6 and 7 which carry the friction rolls thereon, since this increases or decreases the application of the compression load on the treads 17, 17$^d$ of the wheels or rolls.

As seen in FIG. 3, this skidding or slippage between the treads 17, 17$^d$ of the rolls and the faces of the friction disks 25 and 26 is further increased by shifting the planes of the rolls 1° or more, also causing a lateral skid or drag on the resilient treads 17 and 17$^d$ of the rolls, since the rolls, in effect are designed and mounted with an excess "toe-in" or "toe-out" depending on the direction of rotation.

In connection with wire cable reels or spools as shown in the drawing, in which the end plates may be rough, uneven, warped or not parallel, the spool 34 is first mounted on the conical bushings 36 with the conical ends inserted in the bore 35, the adjustable end plate 6 being moved up, the tie-rod 24 inserted, and the nut 24$^b$ tightened to draw the plates 6 and 7 closer together, forcing the resilient treads 17, 17$^d$ into the desired frictional contact with the flat surfaces 25$^a$ and 26$^a$ of the friction disks 25 and 26. The contact studs 32 are now brought into positive supporting frictional contact with the end flanges 33 of the cable spool as shown. As the cable 34 is withdrawn from the spool the relative skidding contact of the treads at different radially spaced points on the disks, due to the resiliency of the treads, provides the desired resistance to rotation of the cable spool for maintaining the cable taut with the desired tension thereon.

Where a cable reel is employed, such as made of stiff metal, and the outer surface of the end flanges thereof are flat, smooth, and precisely parallel to each other, in planes which are perpendicular to the axis of the spool, it is possible to omit the friction disks 25 and 26, and use a shorter tie-rod 24 to draw the treads of the rolls down in tight frictional contact with the outer surfaces of the spool and obtain substantially the same uniform resilient resistance to rotation of the spool as in the case where the friction disks 25 and 26 are employed. Of course, the openings in the ends of the spool must be substantially the same diameter as that of the tie-rod 24, or bushed down to substantially the same size.

In the rewinding or rereeling of a cable 34ª onto the spool 34 it is preferable to remove the two rolls 12ᵇ and 14ᵇ from the plate 7 and connect the drive shaft 15ª for the roll 13ᵇ to an air drill or an electric drill 19.

The entire rewind outfit is small, light in weight and compact, and may be mounted on the bumper plate of a conventional mobile "tug" vehicle or any other suitable platform.

Since the construction herein before set forth is capable of a certain range of change and modification without materially departing from the spirit of the invention, I do not limit myself to such specific structure except as hereinafter claimed.

What we claim is:

1. In a cable reel, a flat rectangular base plate having a fixed end plate carried thereon adjacent one end thereof, in perpendicular relation thereto, an adjustable end plate carried by the opposite end of said base plate perpendicular thereto and parallel to said fixed end plate, means for adjusting said adjustable end plate toward and away from said fixed end plate, including a tie-rod shaft extending through said end plates parallel to said base plate and perpendicular to said end plates for drawing said end plates toward each other, a friction disk journalled on said tie-rod in spaced adjacent parallel relation to each of said end plates having a flat friction surface facing the end plate parallel thereto, a plurality of friction rolls journalled on each of said end plates for rotation in planes around the axis of said tie-rod which are angularly disposed to said end plates and spaced radially from the tie-rod, said rolls having resilient rubber-like treads disposed in compressive contact with the friction surfaces of said disks, said friction disks having a plurality of adjustable studs threaded therein perpendicular to the friction surface and disposed in circularly spaced relation to each other around said tie-rod and adjustable for impinging engagement thereof on the side flanges of a wire cable spool when the spool is disposed on said tie-rod between said disks, and means at the centers of said disks facing toward each other for entering the opposite ends of the bore of a wire spool when disposed between said disks for centering the spool on said tie-rod and between the disks during rotation thereof.

2. A cable applicator and rewind unit for a flanged cable spool comprising a support having spaced parallel end plates to receive the spool therebetween on an axis through said end plates perpendicular thereto, one of said end plates being movable relatively toward and away from the other end plate, a plurality of friction rolls journalled on each of said end plates for rotation in angularly disposed planes around said axis perpendicular to said end plates, said friction rolls having compressible resilient rubber-like treads thereon, a friction disk rotatably journalled in concentric relation to said axis adjacent each of said end plates perpendicular to said axis and between the end plates, said disks each having a friction surface disposed for contacting engagement with the treads of the friction rolls carried by each of said end plates, a tie-rod disposed on said axis connecting said end plates together for drawing said end plates toward each other to compress the contacting periphery of the treads of said rolls on said friction surface into tighter contact with said friction surfaces when a wire cable spool is disposed on said axis between said disks, and a plurality of adjustable thrust members spaced around the axis of each of said disks on the side thereof opposite to said friction surface for impinging engagement with the opposite end flanges of a wire cable spool when disposed on said axis between said disks.

3. Apparatus as claimed in claim 2 in which the periphery of the treads of the friction rolls when compressed on said friction surfaces of said friction disks, are disposed for frictional contact with said frictional surfaces over an area on the treads located materially at both sides of a medium plane through the rolls, normal to the axis of the rolls.

4. A wire cable applicator and rewind unit for a flanged wire cable spool comprising a flat supporting plate, having a fixed end plate adjacent one end thereof perpendicular to said supporting plate, an adjustable end plate adjustably mounted on said supporting plate parallel to said fixed end plate and perpendicular to said supporting plate for adjustment toward said fixed end plate, and away from said fixed end plate to receive a cable spool between the same and the fixed end plate, a tie-rod extending through said fixed and adjustable end plates perpendicular thereto in spaced relation above said supporting plate to support a cable spool thereon above said supporting plate and between said end plates, means on said tie-rod for centering the axis of the cable spool thereon, a pair of friction disks journalled on said tie rod between said end plates in axially spaced relation for rotation around the axis of the tie-rod for impinging engagement with the opposite end flanges of a cable spool when interposed between said end plates to securely position the cable spool on said tie-rod against axial movement, one of said friction disks journalled on said tie-rod in spaced adjacent relation to one of said end plates having a flat friction surface facing toward the aforesaid adjacent end plate, a plurality of friction rolls disposed on said adjacent end plate in frictional engagement with said friction surface, said friction rolls having relatively wide resilient cushion treads disposed in planes in radially spaced relation around the axis of said tie-rod in circulary spaced relation to each other substantially perpendicularly to said friction surface with a portion of the tread in contact with the friction surface at one side of the medium plane of the roll disposed in materially closer relation to the axis of rotation of the disks and a portion of the tread of said rolls in contact with the friction surface at the other side of the medium plane of the rolls disposed in materially farther spaced relation to the axis of rotation of the disks to provide a "skidding" frictional contact between the tread of the rolls in contact with said frictional surface at opposite sides of the medium plane of the rolls.

5. Apparatus as claimed in claim 4 in which the friction rolls are disposed on the end plates with their axes in a plane substantially parallel to the friction surface of the friction disk.

6. Apparatus as claimed in claim 5 in which the medium planes of the rolls are perpendicular to the friction surface of the friction disks and the tracking circle of the tread of the rolls is disposed in a toe-in relation on the friction surface of the friction disks to provide a frictional skidding action between the treads of the rolls and the friction surfaces of the disks during rotation of the disks.

7. Apparatus as claimed in claim 6 in which said rolls are journalled on axles carried by the end plates and one of said axles is fixed to one of the rolls and extends outwardly beyond the edge of the side plates for positively driving said roll to rotate said friction disk positively when a power driving means is applied to the extended end of the last mentioned axle.

8. Apparatus as claimed in claim 7, in which the friction rolls are rotatably mounted on both of said end plates and engage the friction surfaces of the friction disks which are adjacent the end plates, and pressure applying adjustable friction lug means spaced around and inwardly of the peripheral portions of the last mentioned surfaces of said friction disks for impinging engagement with the opposite end flanges of a cable spool at a plurality of circularly spaced points around the axis of cable spool when disposed on said tie-rod between said friction disks.

References Cited in the file of this patent

UNITED STATES PATENTS

| | | |
|---|---|---|
| 1,093,390 | Foster | Apr. 14, 1914 |
| 1,284,499 | Wakefield | Nov. 12, 1918 |
| 1,378,734 | Steinberg | May 17, 1921 |
| 1,904,394 | Vacher | Apr. 18, 1933 |
| 1,952,782 | Steadley | Mar. 27, 1934 |
| 2,650,771 | Marion | Sept. 1, 1953 |

FOREIGN PATENTS

| | | |
|---|---|---|
| 704,164 | Germany | Mar. 25, 1941 |
| 1,076,328 | France | Apr. 21, 1954 |